(12) United States Patent
Bouckaert et al.

(10) Patent No.: US 8,156,194 B2
(45) Date of Patent: Apr. 10, 2012

(54) SIGNALING GATEWAY

(75) Inventors: Philippe Bouckaert, Biot (FR); Richard Band, Grenoble (FR); Hamid Wassifi, Juan les Pins (FR); Pierre Garnero, Grasse (FR)

(73) Assignee: Hewlett-Packard Development Company L.P., Houston, TX (US)

( * ) Notice: Subject to any disclaimer, the term of this patent is extended or adjusted under 35 U.S.C. 154(b) by 941 days.

(21) Appl. No.: 11/483,163

(22) Filed: Jul. 10, 2006

(65) Prior Publication Data
US 2007/0016656 A1    Jan. 18, 2007

(30) Foreign Application Priority Data
Jul. 12, 2005   (EP) ................................. 05300576

(51) Int. Cl.
*G06F 15/16* (2006.01)
(52) U.S. Cl. ........................................................ 709/217
(58) Field of Classification Search .................... 709/217
See application file for complete search history.

(56) References Cited

U.S. PATENT DOCUMENTS

| | | | | |
|---|---|---|---|---|
| 5,956,489 A * | 9/1999 | San Andres et al. | | 709/221 |
| 6,434,127 B1 * | 8/2002 | Ha | | 370/328 |
| 6,553,427 B1 * | 4/2003 | Chang et al. | | 719/314 |
| 7,002,935 B2 * | 2/2006 | Kriaras et al. | | 370/328 |
| 7,027,809 B1 * | 4/2006 | Smith et al. | | 455/423 |
| 7,139,783 B2 * | 11/2006 | Hinshaw et al. | | 707/205 |
| 7,444,674 B1 * | 10/2008 | Etique et al. | | 726/12 |
| 2002/0075905 A1 * | 6/2002 | Goldstein | | 370/522 |
| 2002/0093981 A1 * | 7/2002 | Turina et al. | | 370/467 |
| 2002/0186687 A1 * | 12/2002 | Roque et al. | | 370/352 |
| 2004/0001517 A1 * | 1/2004 | Lamberton et al. | | 370/522 |
| 2004/0215746 A1 * | 10/2004 | McCanne et al. | | 709/219 |
| 2005/0047401 A1 * | 3/2005 | Garnero et al. | | 370/353 |
| 2005/0070278 A1 * | 3/2005 | Jiang | | 455/432.3 |
| 2005/0186979 A1 * | 8/2005 | McCann et al. | | 455/466 |
| 2005/0249190 A1 * | 11/2005 | Birch | | 370/352 |
| 2006/0009213 A1 * | 1/2006 | Sturniolo et al. | | 455/426.1 |
| 2006/0010078 A1 * | 1/2006 | Rezvani et al. | | 705/66 |
| 2006/0013201 A1 * | 1/2006 | Bettis et al. | | 370/352 |
| 2006/0045103 A1 * | 3/2006 | Garnero et al. | | 370/401 |
| 2006/0149811 A1 * | 7/2006 | Bennett et al. | | 709/203 |
| 2006/0209695 A1 * | 9/2006 | Archer et al. | | 370/235 |
| 2006/0248047 A1 * | 11/2006 | Grier et al. | | 707/2 |
| 2007/0234041 A1 * | 10/2007 | Lakshmeshwar et al. | | 713/156 |
| 2007/0297389 A1 * | 12/2007 | Garnero et al. | | 370/352 |
| 2008/0010676 A1 * | 1/2008 | Dosa Racz et al. | | 726/11 |
| 2009/0228816 A1 * | 9/2009 | Vilmos | | 715/764 |

OTHER PUBLICATIONS

Loughney et al., "Signaling Connection Control Part User Adaptation Layer (SUA)," Network Working Group, Oct. 2004, 131 pages.
"Transaction Capabilities Formats and Encoding," ITU-T Recommendation, Jun. 1997, 38 pages.

* cited by examiner

*Primary Examiner* — Firmin Backer
*Assistant Examiner* — Jonathan Bui

(57) ABSTRACT

A signaling gateway for passing messages from a first network to an application server process provided on a second network, the messages comprising a transaction identifier, the signaling gateway being operable to receive a message and read the transaction identifier, identify the application server process from a part of the transaction identifier and forward the message to the application server process.

9 Claims, 3 Drawing Sheets

SIGNALING GATEWAY

This application claims priority from European patent application 05300576.5, filed on Jul. 12, 2005. The entire content of the aforementioned application is incorporated herein by reference.

FIELD OF THE INVENTION

This invention relates to a signalling gateway, an application server and a method of passing messages.

BACKGROUND OF THE INVENTION

When transmitting a series of messages between entities on a communication network, it may be necessary to ensure that each of the messages is recognised by the receiving entity as part of the message sequence. For example, in the SUA protocol, this may be achieved by using a routing context, whilst the TCAP protocol allows for inclusion of a transaction identifier ("TID") in messages to be exchanged between entities. A further requirement which arises with connecting networks is that of ensuring messages from one network are correctly routed to a destination of the other network. A particular example of this is in the connection of networks using Internet protocol (IP) to the existing telephone switched circuit network (PSTN). Where the two networks use different technologies and protocols, it is necessary for identifiers to be appropriately transferred between the messages forwarded on each network.

An approach to providing a reliable connection between IP and SS7 networks has been proposed by the Internet Engineering Task Force (IETF). This includes M3UA, which is a protocol for the transport of any MTP3 signalling over IP, and SUA which defines the protocol for the transport of any SCCP User Part signalling over IP. Two main entities are defined: the signalling gateway (SG), which is the connection point between the SS7 and IP networks, and the application server (AS), which is the software application provided on the IP network which it is desired to make available over the SS7 network. The protocols may be used to connect SS7-based signalling end points (SEP) with an IP based AS thus allowing SS7 networks to access IP based applications.

A function performed by the signalling gateway is to receive SS7 signalling messages and direct them to the appropriate AS. To do so, the SG identifies a routing key (RK) defined by the M3UA or SUA protocol, which uniquely identifies the AS in accordance with parameters in the SS7 message. In general, the RK parameters are found in the header of the SS7 message, although it may be desirable to take into account other elements of the message, such as a SMS originating number, MAP (Mobile Access Protocol) parameters or even some aspect of the message content, in order to direct the message to the appropriate AS.

Under some circumstances, knowing the routing key or TID may not be sufficient to enable a message to be routed to the correct application server process. For example, an application server may have a number of ASPs which generate TIDs which may be overlapping. Thus, when a message is received which identifies an application server and includes a transaction ID, that information may still not be sufficient to identify the specific application server process (ASP) to which the message is directed.

To address this problem, it is possible to attempt to configure the ASP's contained in an AS such that they have non-overlapping TID allocation ranges, but this may not always be possible or desirable. It is also possible for an ASP, when an initial message has been received by the ASP from a calling entity, to reply and modify the "called address" included in the reply message. Subsequent messages from the calling entity will use this modified called address which can be used to route the messages to the correct ASP. This however has disadvantages that it supposes that calling entity is able to modify the dialogue context when receiving the first message from the application server process, and in any case in some circumstances modifying the called address may be undesirable or may be potentially unreliable for future message exchanges.

SUMMARY OF THE INVENTION

According to a first aspect of the invention, we provide a signalling gateway for passing messages from a first network to an application server process provided on a second network, the messages comprising a transaction identifier, the signalling gateway being operable to receive a message and read the transaction identifier, identify the application server process from a part of the transaction identifier and forward the message to the application server process.

According to a second aspect of the invention, we provide an application server operable to receive an initial message from a calling entity forwarded by a signalling gateway, generate a continuation message, the continuation message including a transaction identifier, wherein the transaction identifier includes at least one of a part identifying an application server process and a further part identifying the application server, and forward the continuation message to the signalling gateway.

According to a third aspect of the invention, we provide a method of passing messages from a first network to an application server process provided on a second network, the messages comprising a transaction identifier, the method comprising the steps of receiving a message and reading the transaction identifier, identifying the application server process from a part of the transaction identifier and forwarding the message to the application server process.

BRIEF DESCRIPTION OF THE DRAWINGS

An embodiment of the invention will now be described by way of example only with reference to the accompanying drawings wherein.

DETAILED DESCRIPTION OF THE PREFERRED EMBODIMENTS

Figure 1:
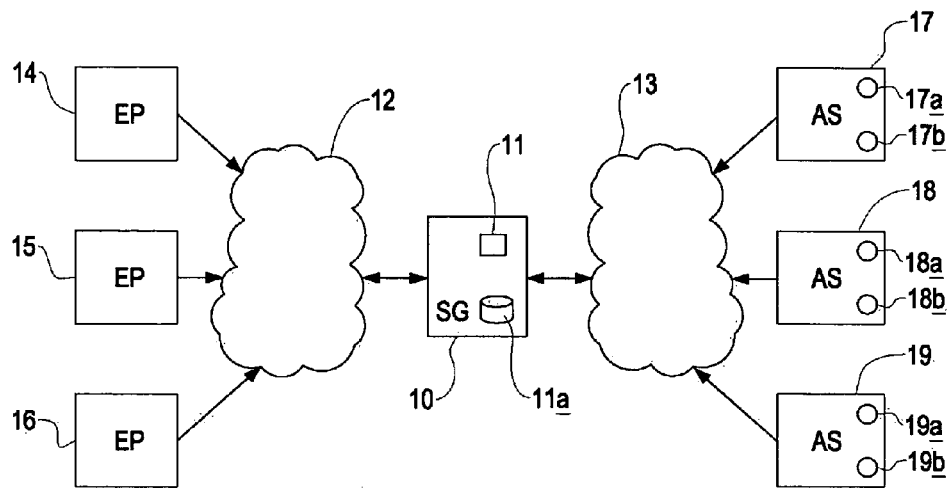
FIG. 1 is a diagrammatic illustration of a network including a signalling gateway embodying the present invention.
Figure 2:
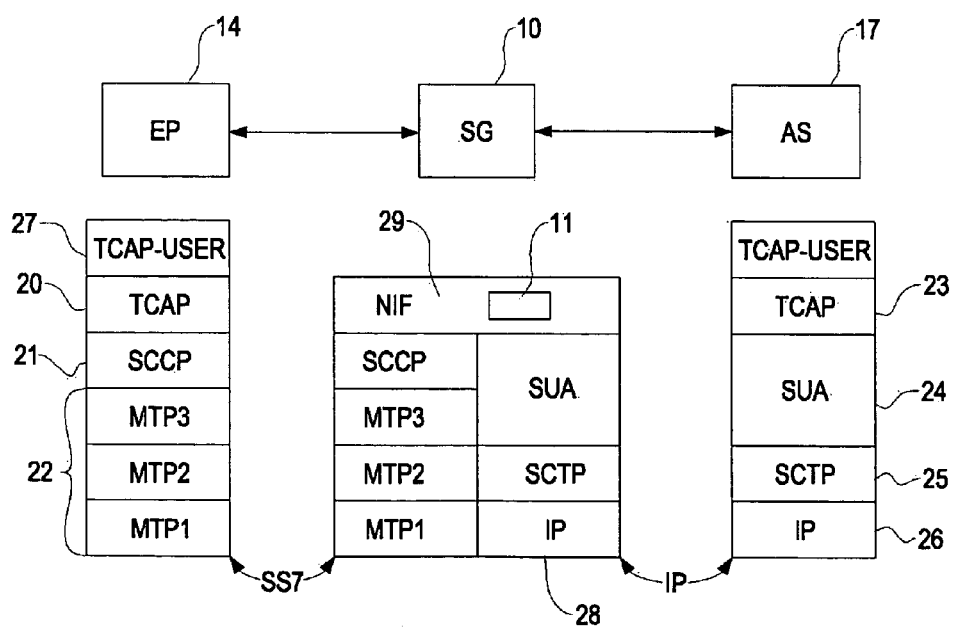
FIG. 2 is a diagrammatic illustration of the architecture of the network of FIG. 1.

Referring to FIG. 1, a signalling gateway embodying the present invention is shown at 10, provided with a routing key interpreter 11. The signalling gateway 10 is operable to communicate over a first network 12 and send and receive messages to and from end points on the network 12 using a first protocol, in this example using the SS7 protocol. The signalling gateway 10 is also able to communicate over the second network 13, in this example using the IP protocol. The signalling gateway 10 is operable to send and receive messages via the first network 12 from a plurality of end points 14, 15, 16, and to transmit and receive messages over the second network 13 from a plurality of application servers 17, 18, 19. Each application server 17, 18, 19 here contains a plurality of application server processes, illustrated at 17a, 17b, 18a, 18b, 19a, 19b. As seen in FIG. 2, the protocols used for transmitting messages over the first network 12 comprise a Transaction Capabilities Application Part (TCAP) layer over the SCCP layer 21 and then the appropriate Message Transfer Protocol (MTP) layers shown at 22. The application servers 17, 18, 19 transmit messages using an TCAP User Part over a TCAP layer shown at 23 over a SCCP User Adaptation layer (SUA) 24, and use the Stream Control Transmission Protocol (SCTP) 25 over the Internet Protocol (IP) layer 26. The signalling gateway architecture generally shown at 28 has a nodal interworking function (NIF) illustrated at 29 to convert SS7 messages to SUA messages and vice versa using the routing key interpreter generally indicated at 11. The signalling gateway 10 may sit between any other appropriate pair of protocols as desired; for example, the signalling gateway 10 may be operable convert SS7 signals to M3UA messages or otherwise as desired. Optionally, a Mobile Application Part (MAP) layer 27 may be provided over the TCAP layer 20 as an example of a TCAP User Part.

Each application server 17, 18, 19 has a unique routing key associated with it. The routing keys may be configured statically at the application server 17, 18, 19 and at the signalling gateway, or maybe configured statically at the application server which then dynamically registers itself at the signalling gateway 10 by means of routing key management messages. The routing keys are stored in a store shown at 11a. To match a routing key to an incoming message, the routing key interpreter 11 is operable to read a message and identify the values of certain parameters within the message. The routing key interpreter 11 then identifies the routing key that matches the values of the parameters and returns an output.

The value of the routing key or other information however may not be sufficient to identify each application server process 17a, 17b, 18a, 18b, 19a, 19b uniquely, and to do so the signalling gateway 10 further makes use of the TID included in messages exchanged between the end points 14, 15, 16 and the application server 17, 18, 19. The TID parameters may be set with reference to any appropriate specification. For example, the ITU-T recommendation specifies that the length of a TID is between 1 and 4 bytes. Similarly, the SUA RFC3868 specifies that the TID label is composed of three fields; a start parameter setting the start parameter of the label, between 0 (LSB) and 31 (MSB), an end parameter setting the end position of the label, between 0 (LSB) and 31 (MSB), and the label value which is a 16 bit integer which is unique across an AS; i.e. no two ASP's of that AS will have the same label value. In each case, it will be apparent that the TID may not require a full set of 32 bits, and that some bits will be available for the signalling gateway 10.

Figure 3:
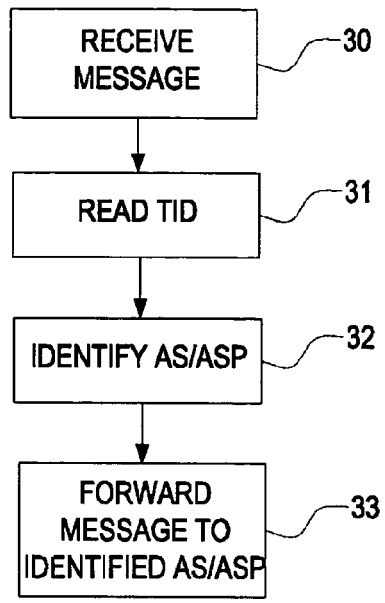
FIG. 3 is a flow diagram illustrating a method of handling messages embodying the present invention.

A method of handling such messages is illustrated with reference to FIG. 3. At step 30 the signalling gateway 10 receives a message from a calling entity, one of the end points 14, 15, 16, and at step 31 reads the TID included in the message, and in particular reads the part of the message identifying the ASP, for example the four most significant bits. At step 32, the signalling gateway 10 identifies the corresponding ASP process 17a, 17b, 18a, 18b, 19a, 19b from the appropriate bits read at step 31, and at step 33 forwards a message to the ASP.

Figure 4A:
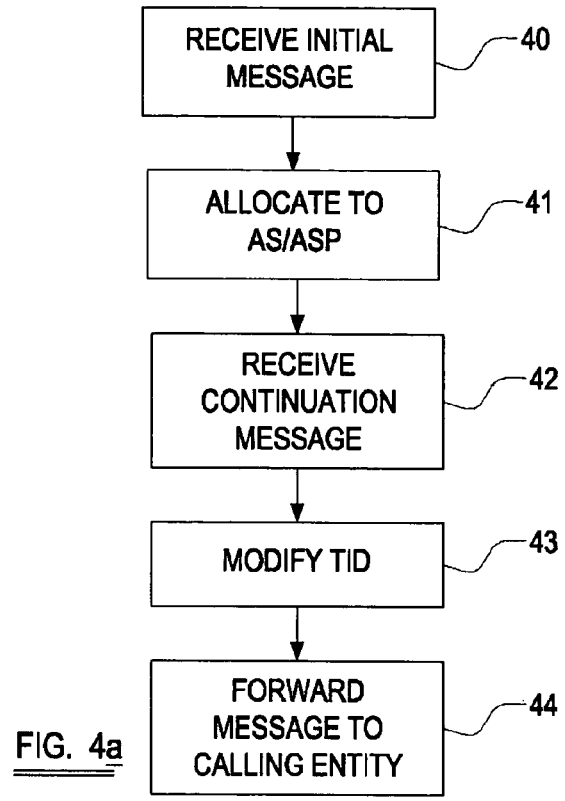
FIG. 4a is a diagrammatic illustration of a method of handling an initial message.
Figure 4B:
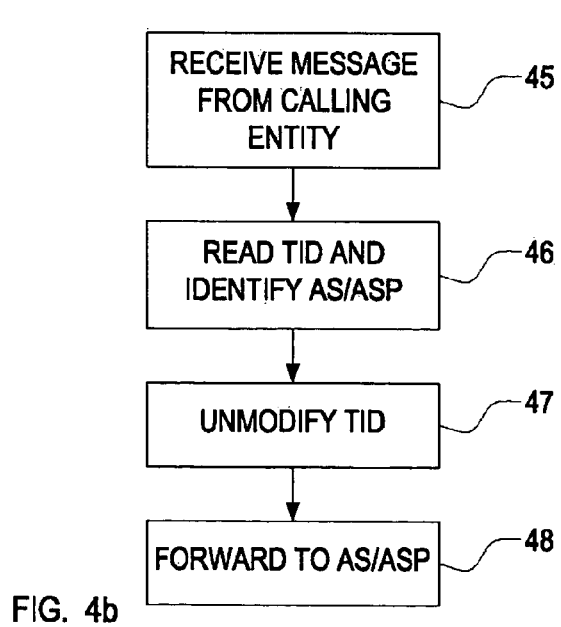
FIG. 4b is a flow diagram illustrating a method of handling a further message.
Figure 5:
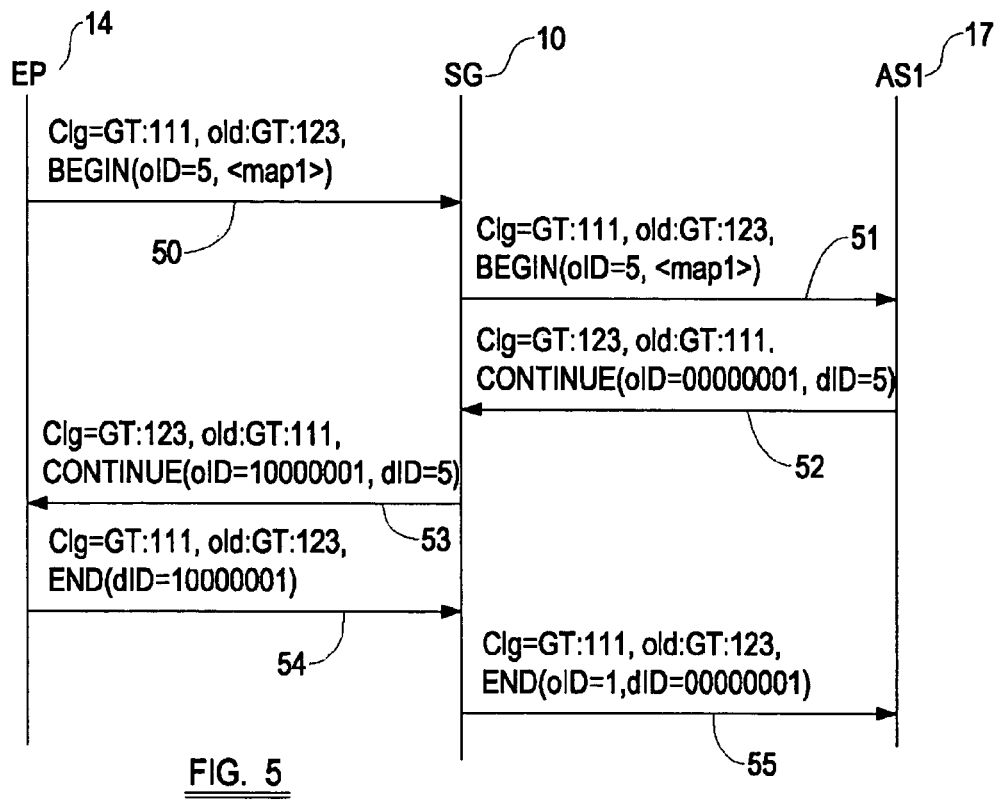
FIG. 5 is a diagrammatic illustration of message exchanges in accordance with the method of FIGS. 4a and 4b, and, FIG. 6 is a diagrammatic illustration of message flow in a further embodiment of the invention.

The part of the TID identifying the ASP, or indeed a further part of the TID identifying the application server 17, 18, 19, may be provided by the signalling gateway 10 or the application server if desired. For example, with reference to FIGS. 4a, 4b and 5, the TID may be modified by the signalling gateway 10. As shown in step 40 in FIG. 4a and indicated at 50 in FIG. 5, the signalling gateway 10 receives an initial message, in this example a TCAP BEGIN message from one of the end points 14. The initial message includes a global title GT=111 identifying the calling entity, for example end point (EP) and a global title GT=123 identifying the called entity, in this case the application server 17. The initial message 50 also includes MAP parameters indicated at <map 1>. The signalling gateway reads the called global title value GT=123 and the MAP parameters, allocates the message to a particular ASP 17a as shown at step 41 and forwards the message to ASP 17a as shown at 51. To continue the message exchange, the ASP 17a generates a continuation message, in this example a TCAP CONTINUE message as shown in 52 and transmits this to the signalling gateway which receives it as shown in step 42 of FIG. 4a. As shown in FIG. 5, the message 52 includes a TID shown as OID=00000001. At step 43, the signalling gateway 10 modifies the TID so that the most significant bits identify the ASP 17a and at step 44 transmits the message to the calling entity, EP14. As illustrated at 53, the message still uses the called and calling entity addresses which are unchanged from the original message 50, but the most significant bits of the TID have been changed to identify the ASP 17a. When a further message is received from the EP14, for example a TCAP END message 54, that message will include the transaction ID with the most significant bits identifying the ASP 17a. As shown at step 45 in FIG. 4b, the signalling gateway 10 receives the message 54 and reads the most significant bits of the TID to identify the ASP 17a, and then at step 47 removes the part of the TID which identifies the ASP 17a. At step 47, the signalling gateway 10 then forwards the message as shown at 55 to the appropriate AS 17 and ASP 17a. As will be apparent from FIG. 5, the transaction ID in the message sent to the ASP 17a is the same as that received by the signalling gateway 10 in message 52, and as such the method is transparent to the AS/ASP.

The mapping between the value of the parts of the TID and the corresponding AS/ASP may be maintained in any appropriate manner by the signalling gateway 10, for example by storing the mapping at the signalling gateway 10 in the store generally indicated at 11a. The routing key interpreter 11 may be operable, for example, to take the part of the TID identifying the ASP into account when identifying the values of certain parameters within a message.

Figure 6:
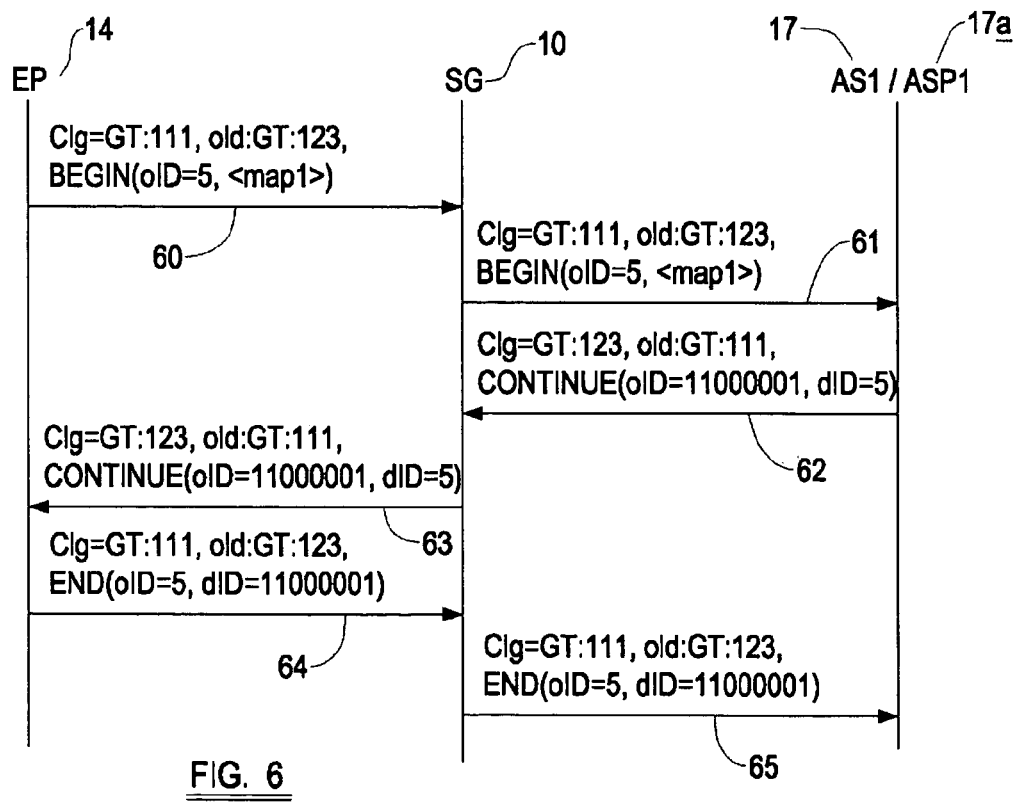

In an alternative implementation as shown in FIG. 6, the part of the TID indicating the ASP and a further part of the TID indicating the application server may be allocated by the AS or ASP. As shown at 60, an initial message is transmitted from an end point 14 to the signalling gateway 10 in like manner to message 50 in FIG. 5. At 61, the signalling gateway 10 then forwards this message to the ASP 17a, again in like manner to the message 51 of FIG. 5. At step 62, the ASP 17a sends a continuation message including a TID, but in this case the TID includes, in this example in its most significant bits, a part indicating the ASP 17a and a further part indicating the AS 17. As shown at 63, this message is forwarded by the signalling gateway to the end point 14 and a subsequent message 64 from the end point 14 includes the TID as generated by the ASP and included in the continuation message 62. By reading the part and further part of the TID, the message can be forwarded by the signalling gateway 10 as shown at 65 to the appropriate ASP 17a.

As discussed above, the mapping of the part or further part of the TID to a corresponding AS or ASP may be performed by the routing key interpreter 11 which interprets routing contexts or routing keys. In one information, a routing context which refers to a routing key defined on, for example, MAP parameters, may also refer to another routing key which is defined on an AS address, such as a global title and a field of the TID. Consequently, the signalling gateway 10, through the routing key interpreter 11, will be able to receive an SCCP or TCAP, or indeed MAP message including a routing key and the routing key interpreter 11 is able to use the routing context to identify the further routing key which includes the transaction ID field.

This can be advantageous when several application servers share the same address, for example a global title GT=123. The further routing context can then include a separate transaction ID. For example;
RC1 includes RK (GT=123, TID label=(start=0, end=3, label=1))
RC2 includes RK (GT=123, TID label=(start=0, end=3, label=2))
RC3 includes RK (GT=123, TID label=(start=0, end=3, label=3)).

Further, in the example of FIG. 1 where three application servers each have two application server processes, the TID labels can be configured as follows;
AS1:
ASP1: (start=0, end=7, label=11)
ASP2: (start=0, end=7, label=12)
AS2:
ASP1: (start=0, end=7, label=21)
ASP2: (start=0, end=7, label=22)
AS3:
ASP1: (start=0, end=7, label=31)
ASP2: (start=0, end=7, label=32)

Thus, the part and further part of the TID will uniquely identify an ASP located on a particular AS.

It will be apparent that either method modifying the TID may refer to either or both of the relevant AS and ASP. For example, the method of FIGS. 4a, 4b and 5 may include modifying the TID to identify both the AS and ASP, rather than just the ASP as shown in that example. Similarly, in the implementation of FIG. 6, the part of the TID allocated by the ASP may simply identify the ASP alone, for example in the circumstances where the ASP is on a single AS having a given address.

The signalling gateway and method of the present invention thus allows messages to be correctly routed by a signalling gateway to a uniquely identified AS or ASP, in a manner which is transparent to the AS/ASP and the end point, without requiring the ASPs of one or more ASs to be configured to have non-overlapping TID ranges, and to correctly pass on messages in an SS7 protocol where there will be insufficient information in the messages to identify the AS or ASP.

The invention claimed is:

1. A signaling gateway for passing messages from a first network to an application server process provided on a second network, the messages comprising a transaction identifier, wherein
the transaction identifier comprising a set of bits utilized by a transmission protocol, and a set of remaining bits comprising a part;
the signaling gateway is configured to receive an initial message from a calling entity and read the transaction identifier within the initial message,
to identify the application server process from the part of the transaction identifier,
to forward the initial message to the application server process,
to receive a continuation message from the application server process, in response to the application server process receiving the initial message, the continuation message including the transaction identifier,
to modify the transaction identifier within the continuation message as a modified transaction identifier, and
to forward the continuation message to the calling entity,
wherein the modified transaction identifier includes at least a part identifying the application server process and a further part identifying an application server prior to forwarding the continuation message to the calling entity, and the set of remaining bits of the transaction identifier comprises the part and the further part.

2. A signaling gateway according to claim 1, wherein the part identifying the application server process includes most significant bits of the modified transaction identifier.

3. A signaling gateway according to claim 2, configured to receive a further message from the calling entity, the further message including the modified transaction identifier, wherein the signaling gateway is configured to remove the part identifying the application server process and the further part identifying the application server from the transaction identifier of the further message prior to forwarding the further message to the application server process.

4. A signaling gateway according to claim 1, wherein the initial message further comprises a routing key and the signaling gateway is configured to forward the initial message to the application server process in accordance with the routing key.

5. A signaling gateway according to claim 1, wherein the first network comprises an SS7 network and the second network comprises an IP network.

6. A signaling gateway according to claim 5, wherein the messages from the first network are in accordance with a TCAP protocol.

7. An application server configured to
receive an initial message from a calling entity forwarded by a signaling gateway,
to generate a continuation message, in response to receiving the initial message, the continuation message including a transaction identifier comprised of a set of bits utilized by a transmission protocol
to modify the transaction identifier within the continuation message as a modified transaction identifier, wherein the modified transaction identifier includes a set of remaining bits comprising at least a part identifying an application server process and a further part identifying the application server, and
to forward the continuation message to the signaling gateway.

8. A method of passing messages from a first network to an application server process provided on a second network, the messages comprising a transaction identifier comprised of a set of bits utilized by a transmission protocol and a set of remaining bits including a part, comprising the steps of:
receiving by a signaling gateway an initial message from a calling entity and reading the transaction identifier within the initial message,
identifying by the signaling gateway the application server process from the part of the transaction identifier;

forwarding by the signaling gateway the message to the application server process;

receiving by the signaling gateway a continuation message from the application server process, in response to the application server process receiving the initial message, the continuation message including the transaction identifier;

to modify the transaction identifier within the continuation message as a modified transaction identifier; and forwarding by the signaling gateway the continuation message to the calling entity, wherein the modified transaction identifier includes at least a part identifying the application server process and a further part identifying an application server prior to forwarding the continuation message to the calling entity, and the set of remaining bits of the transaction identifier comprises the part and the further part.

9. A method according to claim 8, wherein the modified transaction identifier is modified such that most significant bits of the modified transaction identifier identify the application server process.

* * * * *